United States Patent [19]

Ogano et al.

[11] Patent Number: 4,514,917
[45] Date of Patent: May 7, 1985

[54] SELF-PROPELLED WORKING VEHICLE

[75] Inventors: Takeo Ogano; Hiroshi Sueshige; Sakichi Hatakeyama, all of Saitama, Japan

[73] Assignee: Honda Giken Kogyo Kabushiki Kaisha, Tokyo, Japan

[21] Appl. No.: 614,204

[22] Filed: May 25, 1984

[30] Foreign Application Priority Data

May 25, 1983 [JP] Japan .................. 58-93197

[51] Int. Cl.$^3$ .............................. E01H 5/09
[52] U.S. Cl. ........................ 37/249; 37/257; 192/3.54
[58] Field of Search .......... 37/244, 248–252, 37/257; 56/11.4; 192/3.54

[56] References Cited

U.S. PATENT DOCUMENTS

| 2,809,389 | 10/1957 | Collins et al. | 37/244 |
| 3,423,856 | 1/1969 | Fisue | 37/244 |
| 3,580,351 | 5/1971 | Mollen | 37/257 |
| 3,791,052 | 2/1974 | Van Derlely | 37/244 |
| 4,101,014 | 7/1978 | Matheson | 37/244 |
| 4,457,086 | 7/1984 | Bacon | 37/257 |

FOREIGN PATENT DOCUMENTS 850790 8/1981 U.S.S.R. .................. 37/244

Primary Examiner—E. H. Eickholt
Attorney, Agent, or Firm—Armstrong, Nikaido, Marmelstein & Kubovcik

[57] ABSTRACT

A self-propelled working vehicle including an engine, a working implement and a running mechanism driven both by the engine, and a friction disc type main transmission for transmitting the driving power of the engine to the running mechanism. The working vehicle has a sub-transmission interposed between the engine and the main transmission.

5 Claims, 5 Drawing Figures

SELF-PROPELLED WORKING VEHICLE

BACKGROUND OF THE INVENTION

1. Field of the Invention

The present invention relates to a self-propelled working vehicle. Particularly, it relates to a self-propelled working vehicle of the type which includes an engine, a working implement driven by the engine, and a road wheel or catapillar driven by the engine.

2. Description of Relevant Art

There are known self-propelled working vehicles of the type which includes an engine, a working implement driven by the output of the engine, and a road wheel driven by the same, such as proposed in the U.S. Pat. No. 3,580,351 by I. J. Mollen.

In the U.S. Patent by Mollen, the working implement is given in the form of the combination of a snow-gathering device and a snow-blowing device.

In other words, the U.S. Patent by Mollen has disclosed a self-propelled working vehicle in the form of a snow-removing tractor including a power transmitting system diagrammatically shown in the attached "prior art" drawing FIG. 5.

In FIG. 5, designated at reference numeral 200 is the power transmitting system. The power transmitting system 200 is provided with an engine 201 having a crankshaft 202 arranged in the longitudinal or fore to aft direction of the vehicle. The engine power as output from the crankshaft 202 is transmitted by means of a drive pulley 203 mounted on one end of the crankshaft 202, through a drive belt 204 trained by the drive pulley 203, to a driven pully 205 mounted on the rear end of a shaft 208 as a drive shaft of a working implement having a snow-gathering auger 206 and a snow blower 207, thereby driving the combination of the auger 206 and the blower 207 to work as an implement for snow removal.

Moreover, the crankshaft 202 is adapted to drive, through a gear train 209, a cam shaft 210 having mounted on one end thereof another drive pulley 211 for training another drive belt 212. The engine power as output via the drive belt 212 is transmitted by means of a main transmission 213 to an axle 221 of a driving road wheel 222. The main transmission 213, which is arranged longitudinally of the vehicle, includes a drive shaft 214 having mounted on the front end thereof a driven pulley 215 driven by the drive belt 212 and on the rear end thereof a drive disc 216 extending transversely of the vehicle and a driven shaft 217 arranged perpendicularly to the drive shaft 214, i.e. in the transverse direction of the vehicle, the driven shaft 217 having at either end thereof a friction disc 218 axially slidably splined thereon and brought into frictional engagement with the drive disc 216 and at the other end thereof an output gear 219 mounted thereon.

The friction disc 218 has on the circumference thereof an elastic ring 223 fixed thereto and adapted to effect the frictional engagement with the drive disc 216, thereby to transmit the necessary driving power from the disc 216 to the disc 218. The speed shifting of the driving wheel 222 is effectable in a well-known manner, i.e., by first retreating the drive disc 216 to thereby release the friction disc 218 from the frictional engagement therewith and, then, properly shifting the friction disc 218 along the driven shaft 217, before advancing the drive disc 216 to thereby bring the friction disc 218 again into the frictional engagement therewith.

Although, when such snow-removing tractor is moving on the snow of which accumulation may be uneven depending such as on the ground surface and snow-fall condition, the load in the form of a torque its main transmission is subjected to varies according to the unevenness of snow accumulation, such variation can be effectively absorbed by the main transmission which is of a friction disc type as described above.

However, such snow-removing tractor is adapted to proceed performing a snow-removal work, thus having its running speed preset to be remarkably low as of a vehicle, i.e. as low as a walking speed of man, so that the movment to and from the working place must be very slow.

To overcome such shortcoming, the main transmission 213 may be first modified by enlarging the diameter of the drive disc 216 as well as the travel range of the friction disc 218. Such modification, however, is to unavoidably extend the dimensions of the transmission itself, thus scaling up the snow-removing tractor. In this respect, when taking into consideration the load variation attendant the running on the snow, it may be most favorable to employ the friction disc type transmission which is able to be adapted with a relatively simple construction to cope with the load variation. However, for the dimensional parameters of such conventional transmission are determined to be best effective at a very low moving speed, which implies that any modification such as by the enlargement of drive disc diameter may not bring into existence more than the lowerment in the durability of such transmission. This is because expanding the running speed range of snow-removing tractor in such a manner as described above is to expand the reduction gear ratio of transmission, which means subjecting a friction disc thereof to larger torques.

In other words, it may be considerably difficult to expand the running speed range of such snow-removing tractor without marring the inherent function of its friction disc type transmission and without enlarging the size thereof.

On the other hand, as a second possible modification, also the interposition of a sub-transmission between the main transmission 213 and the driving road wheel 222 may serve to expand the running speed range of the snow-removing tractor. Such interposition, however, is to again give rise to an expansion of the reducing gear ratio of power transmission system similarly to the case of the foregoing modification, thus causing the main transmission to be directly subjected to an increasing torque in reverse proportion to the gear ratio expansion, which is unfavorable to the durability of the main transmission.

In this respect also, it may be considerably difficult to expand the running speed range of a conventional snow-removing tractor having a friction disc type transmission, without giving such unfavorable effect on the durability of the transmission.

The present invention has been achieved to effectively overcome such conventional problems of a self-propelled working vehicle, particularly of a snow-removing tractor vehicle.

SUMMARY OF THE INVENTION

According to the present invention, there is provided a self-propelled working vehicle comprising: a vehicle frame; an engine mounted on the vehicle frame; a working implement equipped to the vehicle frame and operatively interconnected to be driven with the engine; a running mechanism suspended from the vehicle body, the running mechanism having at least one driving wheel mounted on an axle; a first transmission disposed in the vehicle frame, the first transmission having a drive shaft extending in the fore to aft direction of the vehicle, a drive disc secured at the center thereof to the rear end of the drive shaft, a driven shaft arranged behind the drive disc perpendicularly to the drive shaft and operatively connected to the axle of the driving wheel, and a friction disc fitted on and arranged to be slidable along and non-rotatable about the driven shaft and adapted along the circumference thereof to be frictionally engageable with the drive disc; and a second transmission disposed in the vehicle frame, the second transmission being operatively connected to the engine and supporting at least the front end of the drive shaft, such that the driving power from the engine is transmittable to the drive shaft in the form of a torque, shiftably between at least a pair of speed modes.

Accordingly, an object of the present invention is to provide a self-propelled working vehicle including a main transmission of a friction disc type, which permits the running speed range thereof to be expanded without giving rise to the diameter enlargement in the main transmission and without marring the durability the transmission.

The above and further features, objects and advantages of the present invention will more fully appear from the following detailed description of the preferred embodiment of the invention when the same is read in conjunction with the accompanying drawings.

DETAILED DESCRIPTION OF THE PREFERRED EMBODIMENT

Figure 1:
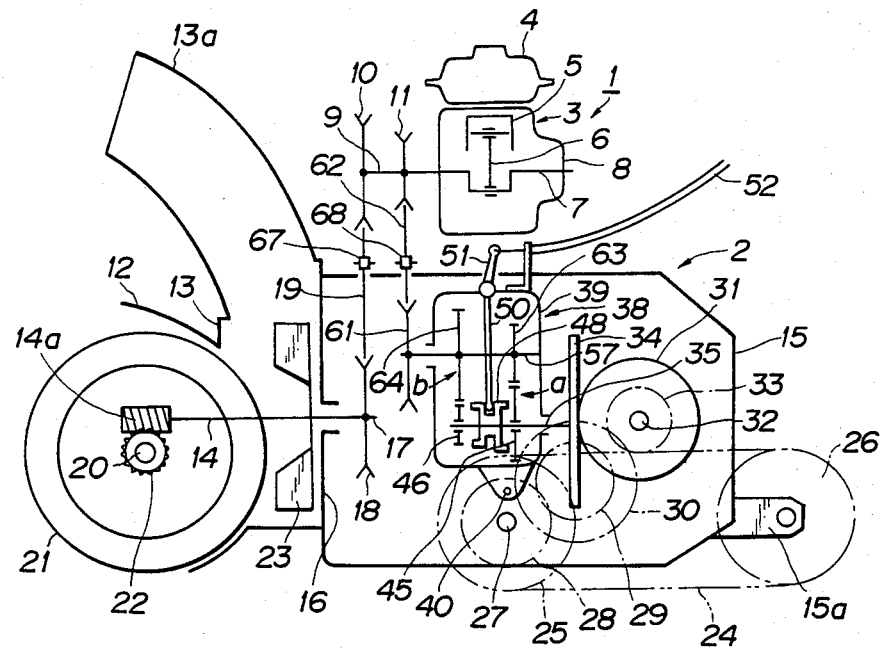
FIG. 1 is a schematic longitudinal sectional view, with a diagrammatic representation of the power transmission system, of a self-propelled working vehicle according to the preferred embodiment of the invention.
Figure 2:
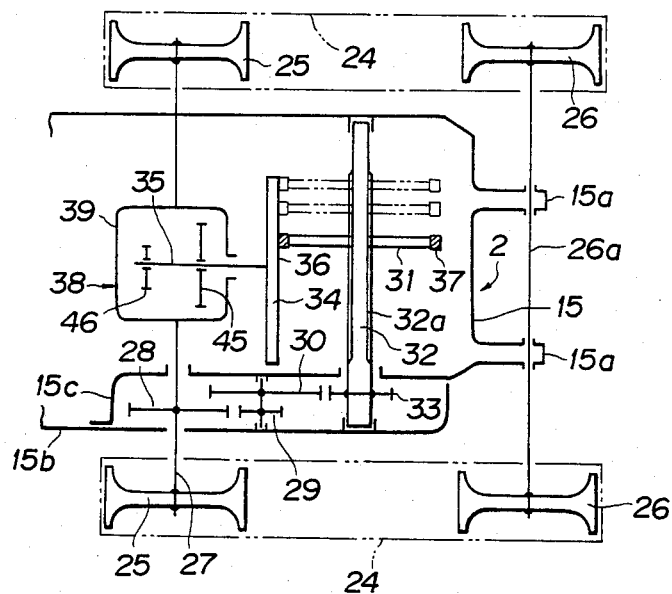
FIG. 2 is a schematic plan view of an essential part of the self-propelled working vehicle of FIG. 1.

Referring first to FIGS. 1 and 2, designated at reference numeral 1 is a self-propelled working vehicle in the form of a snow-removing tractor according to the preferred embodiment of the invention, in which the manner of taking out power from an engine as well as transmitting the power from the drive disc through a friction disc to a driving wheel is similar to that of the before-described prior art.

The snow-removing tractor 1 has a vehicle body 2 equipped with an engine 3 provided with a fuel tank 4. The engine 3 is accommodated in an engine casing 8 on the vehicle body 2 and arranged in the longitudinal or fore to aft direction of the vehicle body 2, and has a piston 5 connected through a connecting rod 6 to a crankshaft 7. The crankshaft 7 is projected frontwardly of the engine casing 8, to provide a projection 9 which has a pair of drive pulleys 10, 11 mounted thereon and spaced from each other in the axial direction of the crankshaft 7, the pulleys 10 and 11 serving to drive a later-described working implement and the driving wheel, respectively.

The vehicle body 2 has a front partition wall 16 thereof provided on the front side thereof with a blower housing 13, which housing 13 has formed in the lower part thereof an auger cover portion 12 opening frontwardly for accommodating therein an auger 21 and a snow blower 23 as attached implement members and in the upper part thereof a snow-blowing duct portion 13a ascending curvilinearly frontwardly. The snow blower 23 is mounted on an implement drive shaft 14 disposed in the blower housing 31 longitudinally of the vehicle, thus extending in parallel with the crankshaft 7 of the engine 3, the drive shaft 14 having at the front end thereof a warm gear 14a fixed thereto and at the rear end thereof a rear extension 17 extending rearwardly past the partition wall 16. Moreover, the warm gear 14a is arranged to be meshed with a pinion 22 fixed on a driveen shaft 20, which is disposed in the auger cover portion portion 12 transversely of the vehicle and on which the auger 21 is fixed. The rear extension 17 of the implement drive shaft 14 has at the rear end thereof a driven pulley 18 fixed thereto and driven through a drive belt 19 trained by the drive pulley 10 fixed to the crankshaft 7 of the engine 3. Incidentally, the partition wall 16 is provided to thereby separate the blower housing 13 and a body frame 15 of the vehicle body 2 from each other.

In the foregoing arrangement, the auger 21 and the snow blower 23 constitute together with the blower housing 13 accommodating them a working implement for snow removal, of which driving power is transmitted from the crankshaft 7 of the engine 3, through the drive pulley 10, the drive belt 19, and the driven pulley 18, to the implement drive shaft 14, thereby driving to ratate the snow blower 23, and, further through the warm gear 14a and the pinion 22, to the driven shaft 22, thereby driving to rotate the auger 21. Accordingly, the snow gathered by the auger 21 is shifted rearwardly into depth of the blower housing 13 and, subsequently thereto, forced by the rotation of the snow blower 23 to run upwardly through and discharge out of the duct portion 13a, so that the snow removal is favorably made.

Moreover, in the lower part of the body frame 15 of the vehicle body 2, at the left and right thereof, there is provided either of a pair of driving wheels 25, 25 supported on a drive axle 27 suspended from the body frame 15, the driving wheels 25, 25 being adapted to drive a pair of catapillars 24, 24, respectively. The catapillars 24, 24 are guidable with a pair of guiding wheels 26, 26 each respectively fixed to either outer end of a guide axle 26a, which axle 26a is supported by a rearwardly projecting axle-holding portion 15a formed on the rear lower part of the body frame 15. With such running mechanism including the catapillars 24, 24, the snow-removing tractor 1 is guidably driven to move and run, as circumstances require, in an endless traction manner.

The drive axle 27 of the driving wheels 25, 25 has, in a cover 15c provided inside of a side wall 15b, the left side wall in this embodiment, of the body frame 15, a final gear 28 fixed thereon and meshed with either of a pair of idle gears 29, 30 arranged in the cover 15c and adapted to be integrally rotatable with each other.

Further, inside of the rear intermediate part of the body frame 15, there is disposed a friction disc 31 fitted on a revolvably arranged driven shaft 32 extending transversely of the vehicle, which friction disc 31 is splined on a spline 32a of the driven shaft 32 so as to be slidable therealong within a predetermined travel range but non-rotatable thereabout and has along the circumference thereof an elastic ring 37 secured thereto, the elastic ring 37 being high of the friction factor. The driven shaft 32 is extended at the corresponding end thereof into the interior of the cover 15c to have therein an output gear 33 fixed thereto, the output gear 33 being meshed with the other of the idle gears 29, 30. When necessary for shifting the speed mode of the driving wheels 25, 25 and hence of the catapillars 24, 24, the friction disc 31 is slidable along the driven shaft 32 with a shifting mechanism (not shown) in a well-known manner.

Furthermore, in front of the friction disc 31, there is arranged a drive disc 34 turnable in a plane perpendicular to the friction disc 31 and hence parallel with the driven shaft 32, the drive disc 34 having on the rear side thereof a friction surface 36 normally brought into frictional engagement with the elastic ring 37 of the friction disc 31. The drive disc 34 is secured at the center thereof to the rear end of a drive shaft 35 extending normally to the drive disc 34 and perpendicularly to the driven shaft 32 and thus in parallel with the crankshaft 7 of the engine 3, the drive shaft 35 projecting rearwardly out of a sub-transmission 38, which is disposed in the body frame 15 in order to transmit the driving power from the crankshaft 7 to the drive disc 34.

Figure 3:
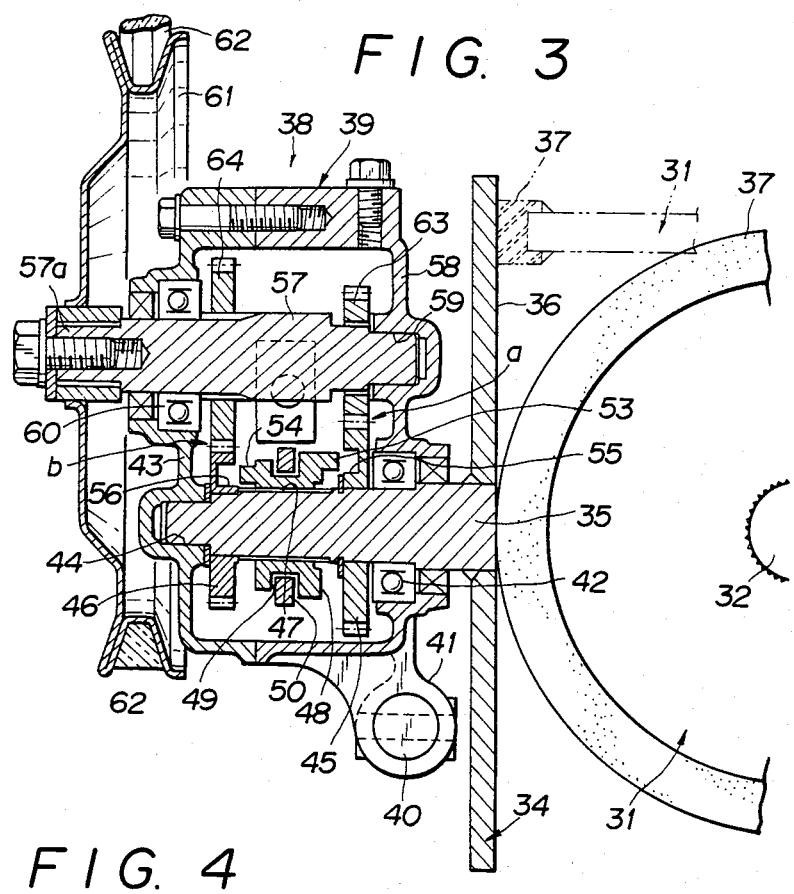
FIG. 3 is an enlarged longitudinal sectional view of a sub-transmission of the self-propelled working vehicle of FIG. 1.

Referring now to FIG. 3, the sub-transmission 38 includes a transmission casing 39 consisting of separable front and rear halves accommodating therein and respectively rotatably bearing the drive shaft 35 and an input shaft 57 arranged in parallel with the drive shaft 35. The casing 39 has in the bottom part thereof a boss 41 formed thereon and pivotably fitted on a pivot shaft 40 arranged transversely of the vehicle, the pivot shaft 40 being secured to the body frame 15. When operating the shifting mechanism of the friction disc 31, the whole part of the sub-transmission 38 is to be pivoted, with an actuating mechanism (not shown), counterlockwise in FIG. 3 about the pivot shaft 41, to thereby disengage the drive disc 34 from the elastic ring 37 of the friction disc 31, before sliding the friction disc 31 along the driven shaft 32 to shift the speed mode thereof. The drive shaft 35 is revolvably supported at the front end thereof with a bearing portion 44 formed on the inside of a front lower part 43 of the casing 39 and in the rear part thereof, at a slightly frontward position from the rear end thereof, by a bearing 42 disposed in the rear lower part of the casing 39. In the casing 39, the drive shaft 35 has a large-diameter gear 45 and a small diameter gear 46 fitted thereon to be both rotatable thereabout and non-slidable therealong, the large-diameter and small-diameter gears 45, 46 being axially spaced from each other. Between the gears 45, 46, on the drive shaft 35, there is formed a spline 47 having a shifter 48 axially slidably splined thereon, in which shifter 48 is formed a circumferential ring slot 49 engaged with a shift fork 50 selectably operable by means of a lever 51 controllable with a control cable 52 shown in FIG. 1. The shifter 48 has formed on the rear part thereof a rear projection 53 and on the front part thereof a front projection 54 on one hand, and the large-diameter and small diameter gears 45, 46 have formed a rear recess 55 in the front face of the former and a front recess 56 in the rear face of the latter on the other hand, such that, when the shifter 48 is slided along the drive shaft 35, the projections 53, 54 are to be either brought into engagement with the corresponding one of the recesses 55, 56, namely, the rear projection 53 and the rear recess 55 as well as the front projection 54 and the front recess 56 constitute a dog clutch.

Moreover, the input shaft 57 arranged in parallel with the drive shaft 35 as described above is revolvably supported at the rear end thereof with a bearing portion 59 formed on the inside of a rear upper part 58 of the casing 39 and in the intermediate part thereof, at a slightly frontward position therein, by a bearing 60 disposed in the front upper part of the casing 39, and has a front extention 57a thereof projecting frontwardly of the casing 39, on which extension 57a is fixed a driven pulley 61 driven by means of a drive belt 62 trained by the drive pulley 11 secured to the crankshaft 7 of the engine 3. In the casing 39, the input shaft 57 has a small-diameter gear 63 and a large-diameter gear 64 fixed both thereon to be normally meshed with the large-diameter and small-diameter gears 45, 46 fitted on the drive shaft 35, respectively, the small-diameter and large-diameter gears 63, 64 being axially spaced from each other.

In the foregoing arrangement of the sub-transmission 38, there is constituted by the small-diameter gear 63 on the input shaft 57 and the large-diameter gear 45 on the drive shaft 35 a low-speed gear train a relatively large of the reducing gear ratio, as well as by the large-diameter gear 64 on the input shaft 57 and the small-diameter gear 46 on the drive shaft 35 a high-speed gear train b relatively high thereof.

As will be understood from FIG. 3, when the gears 63, 64 on the input shaft 57 is driven to rotate, while the shifter 48 is put in an intermediate position between the gears 45, 46 on the drive shaft 35, these gears 45, 46 will idle in a non-resricted state, thus keeping the driving power as transmitted to the input shaft 57 from being further transmitted to the drive shaft 35.

With reference to FIGS. 1 and 3, there will be described below the function of the power transmission system, including the sub-transmission 38, of the snow-removing tractor 1 when the catapillars 24, 24 are driven.

In the state of FIG. 3, the driving force as output from the crankshaft 7 of the engine 3 is transmitted through the drive pulley 11, the drive belt 62, and the driven pulley 61 to the input shaft 57, thereby driving to rotate the gears 63, 64 on the input shaft 57, thus causing the gears 45, 46 on the drive shaft 35, which gears 45, 46 are normally meshed with the gears 63, 64, respectively, to freely rotate at different speeds. Thereafter, when the shift fork 50 is operated to slide the shifter 48 to the right in FIG. 3 to the extent that the rear projection 53 of the shifter 48 is brought into engagement with the rear recess 55 formed in the large-diameter gear 45 on the drive shaft 35, the shifter 48 will rotate integrally with the large-diameter gear 45, thus transmitting therethrough the rotation of the small-diameter gear 63 on the input shaft 57 to the drive shaft 35, thereby driving to rotate at a relatively low speed the drive disc 34 secured to the rear end of the drive shaft 35. As a result, the friction disc 31, which is normally brought into frictional engagement with the drive disc 34, is driven to rotate with the disc 34, thus transmitting the driving power, through the driven shaft 32, the output gear 33, the idle gears 29, 30, the final gear 28, and the drive axle 27, to the driving wheels 25, 25, thereby tracting the catapillars 24, 24 in an endless manner. In this state in which the sub-transmission 38 has alive the low-speed gear train a, the snow-removing tractor 1 is to move at a relatively low speed, which means that the shifting to the low-speed side of the sub-transmission 38 is suitable for the movement of the snow-removing tractor 1 while performing the work of snow removal.

On the other hand, when the shift fork 50 is operated to slide the shifter 48 from the position of FIG. 3 to the extent that the front projection 54 is brought into engagement with the front recess 56 formed in the small-diameter gear 46 on the drive shaft 35, the shifter 48 will rotate integrally with the small-diameter gear 46, thus transmitting therethrough the rotation of the large-diameter gear 64 on the input shaft 57 to the drive shaft 35, thereby driving to rotate the drive disc 34 at a relatively high speed. As a result, similarly to the foregoing case in which the sub-transmission 38 is shifted to the low-speed side, the rotation of the drive disc 34 is transmitted to the driving wheels 25, 25, thereby driving the catapillars 24, 24. In this state in which the sub-transmission 38 has alive the high-speed gear train b, the snow-removing tractor 1 is permitted to run at a relatively high speed, which means that the shifting to the high-speed side of the sub-transmission 38 is suitable when the snow-removing tractor 1 is running to and from the place of snow removal work.

Incidentally, as shown in FIG. 1, the drive belts 19, 62 are each respectively provided with either of a pair of dead-man grip motions including a pair of tensioners 67, 68, respectively, for normally keeping the belts tensioned.

Figure 4:
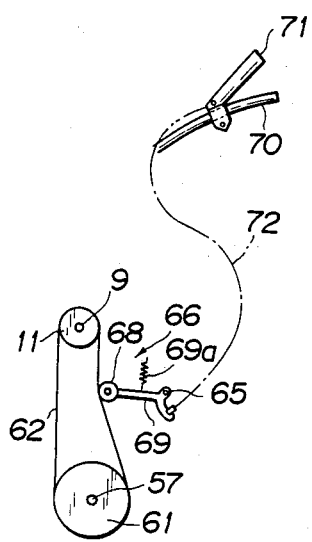
FIG. 4 is an enlarged leftside view of a dead-man grip motion of the power transmission system of FIG. 1.

Referring now to FIG. 4, the dead-man grip motion provided for the drive belt 62 comprises a tension clutch 66 pivoted at the intermediate portion thereof on a pivot pin 65 on the vehicle body 2, the tension clutch 66 having at the front end of a front arm 69 thereof the tensioner 68 rotatably attached thereto and at the central part of the front arm 69 a spring 69a connected at its one end thereto and at its other end to the vehicle body 2 for normally urging the tensioner 68 against the drive belt 62, a cable 72 operatively interconnecting the rear end of the tension clutch 66 with a hand lever 71 disposed on a handle 70 of the snow-removing tractor 1. When the hand lever 71 is gripped down, the cable 72 will be pulled, thus pivoting the tension clutch 66 about the pivot pin 65, thereby releasing the drive belt 62 from the tensioning abutment of the tensioner 68. This condition corresponds to an off state of the tension clutch 66, in which the speed-shifting operation of the sub-transmission 38 is favorably performable. Namely, in this state, when the speed-shifting operation is made, the shock due to such operation can be prevented from being transmitted to the crankshaft 7 of the engine 3, thus permitting a smooth shifting operation.

As will be understood from the foregoing description, according to the preferred embodiment of the invention, there is provided a self-propelled working vehicle in the form of a snow-removing tractor, in which the power transmission system from an engine to a driving wheel has a sub-transmission interposed between a crankshaft of the engine and a main transmission of a friction disc type, thereby permitting the running speed to be properly shifted into a low-speed mode in the movement while performing snow removal work and into a high-speed mode when running to and from the place of snow removal work.

Figure 5:
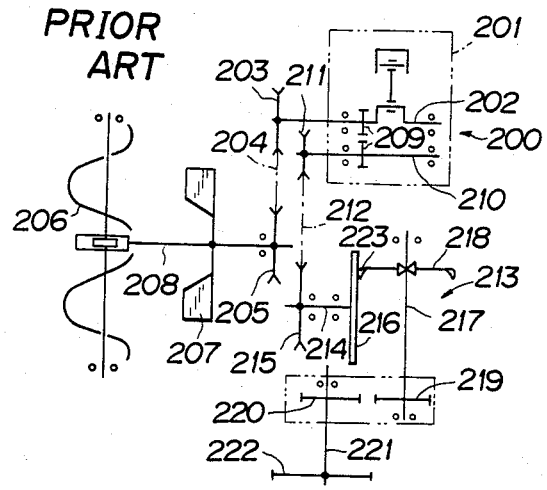
FIG. 5 is a schematic plan view, with a diagrammatic representation of the power transmission system, of a conventional snow-removing tractor vehicle.

Moreover, with such distinctive arrangement of the sub-transmission, the high-speed running of the vehicle is favorably achieved without giving rise to the diameter enlargement in a conventional friction disc type transmission which is inherently adapted for the absorption of torque variation. Such advantage may well be understood from the before-described arrangement of the sub-transmission 38 when the same is compared with the conventional arrangement of the snow-removing tractor shown in FIG. 5, in which the power transmission system has a drive shaft 214 of drive disc supported to be disposed in a similar manner.

Further, the foregoing sub-transmission has a simple structure as described hitherto and may be inexpensive, thus successfully achieving a low-cost production of a self-propelled working vehicle.

Furthermore, an expansion of the reducing gear ratio range of such sub-transmission may substantiate a more compact design of the drive disc as well as of the friction disc.

In the foregoing embodiment, the sub-transmission is proposed in the form of a double-shaft construction, whereas such sub-transmission may be of a triple-shaft construction or of a three-speed or any other suitable type.

It will also be apparent that in the embodiment of the invention the catapillars may be substituted by a pair of ordinary driving wheels.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrective. The scope of the invention is indicated by the appended claims rather than by the foregoing description.

We claim:

1. A self-propelled working vehicle comprising:
a vehicle frame;
an engine mounted on said vehicle frame;
working implement means equipped to said vehicle frame and operatively interconnected to be driven with said engine;
running means suspended from said vehicle body;
said running means having at least one driving wheel mounted on an axle;
first transmission means disposed in said vehicle frame;
said first transmission means having a drive shaft extending in the fore to aft direction of said vehicle, a drive disc secured at the center thereof to the rear end of said drive shaft, a driven shaft arranged behind said drive disc perpendicularly to said drive shaft and operatively connected to said axle of said driving wheel, and a friction disc fitted on and arranged to be slidable along and non-rotatable about said driven shaft and adapted along the circumference thereof to be frictionally engageable with said drive disc;
second transmission means disposed in said vehicle frame; and
said second transmission means being operatively connected to said engine and supporting at least the front end of said drive shaft, such that the driving power from said engine is transmittable to said drive shaft in the form of a torque, shiftably between at least a pair of speed modes.

2. A self-propelled working vehicle according to claim 1, wherein:
said working implement means comprises a snow-gathering auger and a snow-blowing blower provided both on the front part of said vehicle frame.

3. A self-propelled working vehicle according to claim 2, wherein:
said engine has an output shaft arranged in the fore to aft direction of said vehicle; and
said second transmission means comprises a casing member revolvably supporting the front part of said drive shaft fixed to said drive disc, an input shaft rotatably supported and disposed in said casing member in the fore to aft direction of said vehicle, said input shaft having at one end thereof an extension projected outwardly of said casing member and operatively connected to said output shaft of said engine, and shifting means for shifting the driving torque of said input shaft between at least two speed modes and transmitting the same in the form of a driving torque to said drive shaft.

4. A self-propelled working vehicle according to claim 3, wherein:
said shifting means comprises a first gear of a relatively small diameter and a second gear of a relatively large diameter disposed both in said casing member, fixed both on said input shaft, and spaced apart from each other in the axial direction of said input shaft, a third gear of a relatively large diameter and a fourth gear of a relatively small diameter disposed both in said casing member and fixed both on and adapted both to be rotatable about and non-slidable along said drive shaft so as to be constantly meshed with said first gear and said second gear, respectively, a shifter member disposed between said third gear and said fourth gear and fitted on and adapted to be non-rotatable about and slidable along said drive shaft, a pair of recesses formed either in both said third gear and said fourth gear at respective sides thereof facing said shifter member, and a pair of projections formed either on both sides of said shifting member facing said third gear and said fourth gear, respectively, so as to constitute together with said recesses a pair of dog clutches.

5. A self-propelled working vehicle according to claim 1, wherein:
said running means comprises two said driving wheels jointed either to both ends of said axle suspended from said vehicle frame, and a pair of catapillars disposed either at both sides of said vehicle frame and driven both by either of said driving wheels.

* * * * *